US006695112B1

(12) United States Patent
Webber

(10) Patent No.: US 6,695,112 B1
(45) Date of Patent: Feb. 24, 2004

(54) MAGNETIC BRAKE ACTUATED SPRING CLUTCH

(75) Inventor: James L. Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/210,442

(22) Filed: Aug. 1, 2002

(51) Int. Cl.[7] .................. F16D 13/08; F16D 27/108
(52) U.S. Cl. ................. 192/35; 192/37; 192/81 C
(58) Field of Search ................. 192/12 BA, 35, 192/37, 41 S, 43, 81 C

(56) References Cited

U.S. PATENT DOCUMENTS

| 3,393,777 A | * | 7/1968 | Sacchini | .............. | 192/223.4 |
| 4,460,076 A | * | 7/1984 | Yamada | .............. | 192/35 |
| 5,687,822 A | * | 11/1997 | Arai | .............. | 192/84.81 |

OTHER PUBLICATIONS

Marc T. Thompson, PH.D., Permanent Magnet Electrodynamic Brakes Design Principles and Scaling Laws, pp. 1–4.

* cited by examiner

Primary Examiner—Richard M. Lorence
(74) Attorney, Agent, or Firm—Scott A. McBain

(57) ABSTRACT

A magnetic brake actuated spring clutch has an input shaft that is rotatably mounted in a housing, a coaxial output shaft that is rotatably mounted in the housing for rotation relative to the input shaft, and a coil spring surrounding a portion of the output shaft. The coil spring has one end attached to the input shaft and an opposite end attached to a rotor of a magnetic brake. The rotor is journalled on the output shaft, and the magnetic brake further includes a stator that is secured in the housing. The stator includes a permanent magnet and the rotor includes a copperplate that is juxtaposed the permanent magnet. The coil spring has a first part that is wound in one direction and a coaxial second part that is wound in an opposite direction so that the input shaft drives the output shaft in either direction when the spring clutch is engaged by input shaft via the magnetic brake. Alternatively, the stator may include a pair of spaced opposed magnets that are juxtaposed either side of the copper plate. A simple coil spring wound in one direction can be used to provide a one-way magnetic brake actuated spring clutch.

10 Claims, 2 Drawing Sheets

MAGNETIC BRAKE ACTUATED SPRING CLUTCH

FIELD OF THE INVENTION

This invention relates generally to clutches and more particularly to spring clutches that include a coil spring that is wound tightly around a shaft to transfer toque to the shaft.

BACKGROUND OF THE INVENTION

Devices such as automotive lift gates, side doors, deck lids and latches are often power operated by a drive mechanism that has an electric motor as the prime mover. With such devices it is desirable to provide for manual operation of the device in the event of power failure. Ideally, manual operation of the device does not take any more effort than an installation without the drive mechanism.

Some power operated devices, such as power operated lift gates and side doors include an electromagnetic clutch in the drive mechanism. The magnetic clutch allows the drive mechanism to operate the power operated device in either direction, for example to raise or lower the lift gate, or to open or close the side door. However, the electromagnetic clutch also automatically disengages the electric motor from the power operated device at the end of the power operation. Thus in the event of power failure the manual operating effort is reduced substantially by eliminating the requirement for back driving the electric motor. While such drive mechanisms are successful in reducing the manual operating effort, drive mechanisms incorporating electromagnetic clutches are complex and costly due in large part to the electrical operation of the electromagnetic clutch.

SUMMARY OF THE INVENTION

This invention provides a spring clutch that can have all the capabilities of an electromagnetic clutch with respect to driving a power operated device in either direction and automatically disengaging at the end of the power operation so that the device can be operated manually with a reduced effort.

In one aspect, the invention provides a spring clutch that is actuated by a magnetic brake so that an input shaft drives an output shaft in at least one direction and the spring clutch automatically disengages at the end of the driving operation so that the output shaft rotates freely in either direction.

In another aspect, the invention provides a bidirectional spring clutch actuated by a magnetic brake. Here, an input shaft that drives an output shaft in either direction and the spring clutch automatically disengages at the end of the driving operation so that the output shaft rotates freely in either direction.

In either aspect, the spring clutch includes a magnetic brake that operates on the Lorenz principle. As a conductive, non-magnetic metal, such as copper, is moved past a magnet, an opposing or drag force is generated by eddy currents set up in the conductive, non-magnetic metal. The drag force is proportional to the speed of the movement until magnetic saturation occurs at which time, the drag force becomes constant. This drag force is produced in response rotation of an input shaft and when sufficient engages a spring clutch that couples the input shaft to an output shaft for torque transfer. When speed of the input shaft drops below a predetermined value, the drag force is overcome by the spring force and the spring clutch disengages automatically. Thus when the input shaft stops, the output shaft can be rotated freely in either direction. Since the drag force is created without any contact as in the case of friction produced drag force, there is not any wear and the spring clutch will operate with consistent long term performance.

The spring clutch contains a coil spring that is attached to the input shaft at one end and to a rotor of the magnetic brake at the other end. The coil spring is wound around the output shaft and wound down tight onto the output shaft by the magnetic brake resulting is torque transfer in one direction in the case of a one-way spring clutch. The bi-directional spring clutch operates by using two springs wound in opposite directions. The two springs can be connected by a collar or wound from a single piece of wire.

DETAILED DESCRIPTION OF PREFERRED EMBODIMENT

Figure 1:
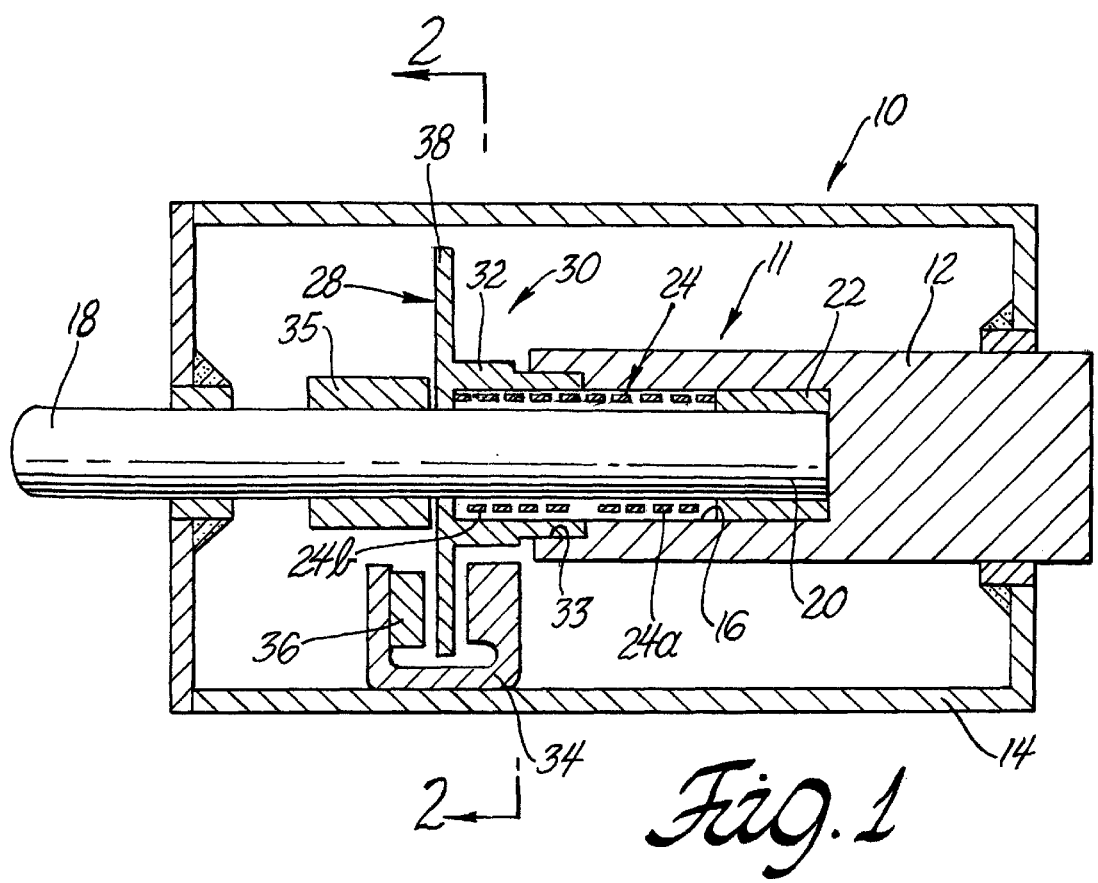
FIG. 1 is a longitudinal section of a magnetic brake actuated spring clutch of the invention showing the spring clutch disengaged.
Figure 2:
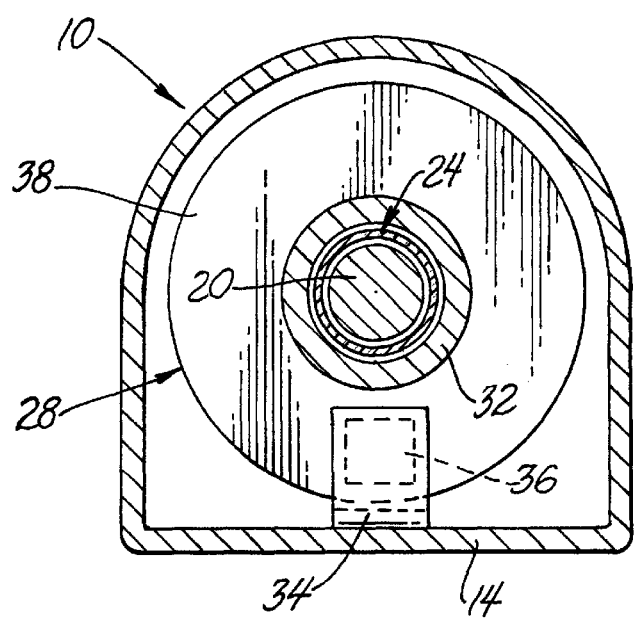
FIG. 2 is a section taken along the line 2—2 of FIG. 1 looking in the direction of the arrows.

Referring now to the drawing, the magnetic brake actuated spring clutch 10 comprises a spring clutch 11 having an input shaft 12 that is rotatably mounted in a housing 14. The input shaft 12 has a bore 16 at one end that receives an end portion of an output shaft 18. The terminus 20 of the output shaft 18 is journalled in a sleeve 22 that is non-rotatably attached to input shaft 12.

Figure 3:
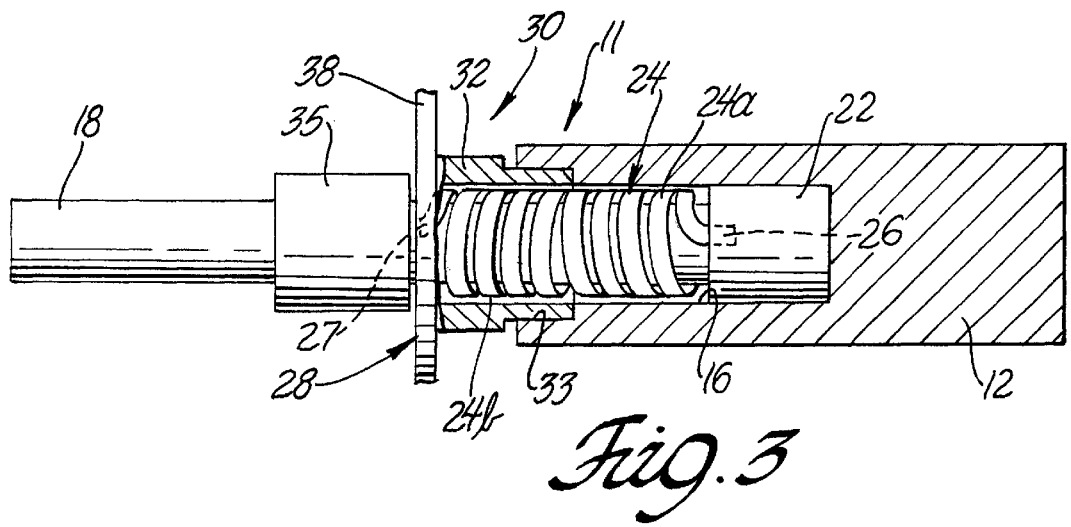
FIG. 3 is fragmentary view showing details of the spring clutch.

A compound coil spring 24 wound from flat wire is disposed in the bore 16 and surrounds the end of the output shaft 18 that is in bore 16. Coil spring 24 has an inboard part 24a that is wound in one direction, e.g. clockwise, and a coaxial outboard part 24b that is wound in the opposite direction, e.g. counter-clockwise. The inboard end 26 of the inboard part 24a is attached to input shaft 12 via sleeve 22 while the outboard end 27 of outboard part 24b is attached to a rotatable member or rotor 28 of magnetic brake 30 as best shown in FIG. 3. (Magnetic brake 30 is sometimes referred to as an eddy current brake or an eddy current damper). While the compound spring 24 is wound from a single piece of flat wire, it is also possible to wind two separate springs in opposite directions and connect the two separate springs by a collar.

Rotor 28 is journalled on output shaft 18 and includes a sleeve 32 that surrounds the outboard part 24b of coil spring 24. Sleeve 32 is journalled in a counterbore 33 of input shaft 12 and retained by collar 35 secured to output shaft 18. Magnetic brake 30 further includes a stationary U-shaped holder or stator 34 that is secured in housing 14. Stator 34 holds a permanent magnet 36 while the rotor 28 includes a plate 38 of electrically conductive, non-magnetic metal that is attached to sleeve 32 and disposed in the slot of U-shaped stator 34 adjacent the permanent magnet 36. Stator 34 is a suitable ferromagnetic material, such as steel and rotor 28 or at least plate 38 is preferably copper. While holder 34 and magnet 36 are stationary and plate 38 is rotatable, it is also possible to have holder 34 and magnet 36 attached to sleeve 32 for rotation by the input shaft 12 and to have a stationary plate of electrically conductive, non-magnetic metal.

Magnetic brake actuated spring clutch 10 operates as follows. When input shaft 12 is stationary, spring clutch 11 is disengaged as shown in FIG. 1, and output shaft 18 can be rotated freely in either direction without any back drive to input shaft 12. However, spring clutch 11 is engaged whenever input shaft 12 is rotated above a predetermined speed, driving the output shaft 18.

Figure 4:
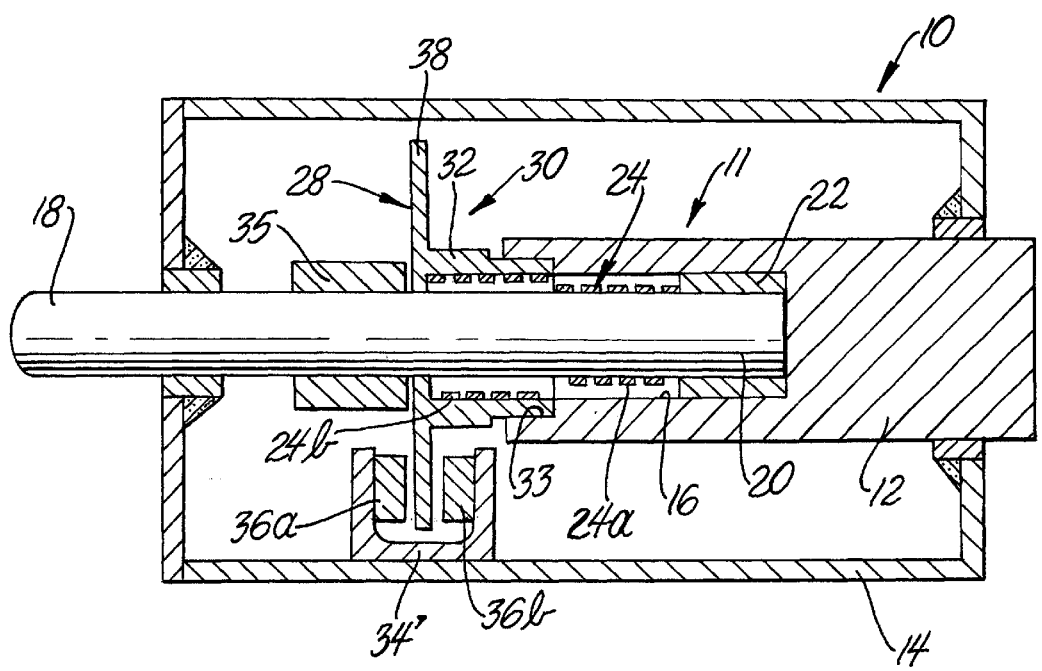
FIG. 4 is a longitudinal section of an alternate magnetic brake actuated spring clutch of FIG. 1 showing the spring clutch engaged.

When input shaft 12 is rotated clockwise, rotor 28 is also rotated clockwise by compound coil spring 24. This produces eddy currents in the copper plate 38 which produce a drag force on copper plate 38 that increases with the speed of the input shaft 12 until magnetic saturation occurs. Rotor 28 lags behind rotating input shaft 12 and twists coil spring 24 in the counter-clockwise direction, winding the clockwise wound, inboard spring part 24a down into tight gripping engagement with output shaft 18 while expanding the counter-clockwise wound outboard part 24b against sleeve 32 (as shown in FIG. 4 in connection with an alternate embodiment described below). Output shaft 18 is then driven clockwise by input shaft 12. When input shaft 12 stops or drops below some predetermined speed, the drag force acting on rotor 24 is overcome by the spring force of twisted coil spring 24 releasing the grip of inboard spring part 24a on output shaft 18. Output shaft 18 is then free to rotate in either direction.

When input shaft 12 is rotated counter-clockwise, rotor 28 is also rotated counter-clockwise by compound coil spring 24. This also produces eddy currents in the copper plate 38 which produce a drag force on the copper plate 38. Rotor 28 now lags behind rotating input shaft 12 and twists coil spring 24 in the clockwise direction 24 winding outboard spring part 24b down into tight gripping engagement with output shaft 18 while expanding the clockwise wound inboard spring part 24a against bore 16 of input shaft 12. Output shaft 18 is then driven counterclockwise by input shaft 12. When input shaft 12 stops or drops below a predetermined speed, the drag force acting on rotor 24 diminishes releasing the grip of outboard spring part 24b and output shaft 18 is then free to rotate in either direction.

FIG. 4 shows an alternate embodiment wherein the U-shaped holder 34a holds opposing magnets 36a and 36b that are spaced apart to provide a gap for plate 38. This eliminates the need for a holder of ferro-magnetic material. In most instances a single magnet 36 or a pair of opposing magnets are sufficient to actuate the spring clutch. However, a plurality of circumferentially spaced magnets or pairs of magnets can be used if the drag force is kept to a reasonable level.

Thus the invention provides a simple and inexpensive spring clutch that allows free rotation of the output member when disengaged, that is engaged in either direction of rotation of the input member and that is automatically disengaged when the input member stops.

While bidirectional spring clutches have been disclosed as the preferred embodiments, the principles of the invention are also applicable to a one way spring clutch in which the spring clutch is engaged in one direction only. The one-way spring clutch of the invention still requires a magnetic brake but does not require two coil springs or a compound coil spring with two coil spring parts. A simple coil spring wound in a single direction will do. In other words, many modifications and variations of the present invention are possible in light of the above teachings. It is, therefore, to be understood that within the scope of the appended claims, the invention may be practiced otherwise than as specifically described.

What is claimed is:

1. A magnetic brake actuated spring clutch comprising:
   an input shaft that is rotatably mounted in a housing, the input shaft having a bore at one end that receives the end of an output shaft for rotation relative to the input shaft,
   a coil spring wound from flat wire disposed in the bore and surrounding the end of the output shaft that is in the bore,
   the coil spring having an inboard part that is wound in one direction and a coaxial outboard part that is wound in an opposite direction,
   the inboard part having an inboard end that is attached the to input shaft,
   the outboard part having an outboard end that is attached to a rotor of a magnetic brake,
   the rotor being journalled on the output shaft and including a sleeve that surrounds the outboard part of the coil spring,
   the input shaft having a counterbore that surrounds the sleeve, and
   the magnetic brake further including a stator that is secured in the housing.

2. The magnetic brake actuated spring clutch as defined in claim 1 wherein one of the stator and the rotor includes at least one permanent magnet and another of the stator and the rotor includes a plate of electrically conductive, non-magnetic metal disposed adjacent the at least one permanent magnet.

3. The magnetic brake actuated spring clutch as defined in claim 1 wherein the stator holds at least one permanent magnet and is made of a ferro-magnetic material, and the rotor includes a plate of electrically conductive, non-magnetic metal that is juxtaposed the magnet.

4. The magnetic brake actuator spring clutch as defined in claim 1 wherein the stator holds spaced opposed permanent magnets and the rotor includes a plate of electrically conductive, non-magnetic metal that is disposed between the spaced opposed permanent magnets.

5. A magnetic brake actuated spring clutch comprising:
   an input shaft that is rotatably mounted in a housing,
   a coaxial output shaft that is rotatably mounted in the housing for rotation relative to the input shaft,
   a compound coil spring surrounding a portion of the output shaft, the coil spring having a first part that is wound in one direction and a coaxial second part that is wound in an opposite direction,
   the first part being attached the to input shaft and the second part being attached to a rotor of a magnetic brake, and
   the magnetic brake further including a stator that is secured in the housing.

6. The magnetic brake actuated spring clutch as defined in claim 5 wherein one of the stator and the rotor includes at least one magnet and another of the stator and the rotor includes at least one plate of electrically conductive, non-magnetic metal that is disposed adjacent the at least one magnet.

7. The magnetic brake actuated spring clutch as defined in claim 5 wherein the stator holds at least one magnet and the rotor includes a plate of electrically conductive, non-metallic metal that is juxtaposed the magnet.

8. The magnetic brake actuated spring clutch as defined in claim 5 wherein the stator holds two spaced opposed magnets and the rotor includes a plate of electrically conductive, non-metallic metal that is disposed between the two spaced opposed magnets.

9. A magnetic brake actuated spring clutch comprising:

a spring clutch having an input shaft that is rotatably mounted in a housing, a coaxial output shaft that is rotatably mounted in the housing for rotation relative to the input shaft, a coil spring surrounding a portion of the output shaft, the coil spring being attached to the input shaft at one end and attached to a rotor of a magnetic brake at another end, the magnetic brake further including a stator that is secured in the housing, one of the stator and the rotor including at least one magnet, and another of the stator and rotor including at least one plate of electrically conductive, non-magnetic metal that is disposed adjacent the at least one magnet.

10. The magnetic brake actuated spring clutch as defined in claim 9 wherein the stator includes a pair of permanent magnets and the rotor includes a plate of electrically conductive, non-magnetic metal that is disposed between the pair of permanent magnets.

* * * * *